United States Patent
Han et al.

(10) Patent No.: US 9,910,348 B2
(45) Date of Patent: Mar. 6, 2018

(54) METHOD OF SIMULTANEOUS LITHOGRAPHY AND ETCH CORRECTION FLOW

(71) Applicant: GLOBALFOUNDRIES INC., Grand Cayman (KY)

(72) Inventors: Geng Han, Fishkill, NY (US); Scott M. Mansfield, Hopewell Junction, NY (US); Dominique Nguyen-Ngoc, Lake Peekskill, NY (US); Donald J. Samuels, Silverthorne, CO (US); Ramya Viswanathan, Austin, TX (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 210 days.

(21) Appl. No.: 14/788,296

(22) Filed: Jun. 30, 2015

(65) Prior Publication Data
US 2017/0004233 A1    Jan. 5, 2017

(51) Int. Cl.
*G06F 17/50* (2006.01)
*G03F 1/00* (2012.01)
(Continued)

(52) U.S. Cl.
CPC ............ *G03F 1/36* (2013.01); *G06F 17/5081* (2013.01); *G03F 1/144* (2013.01); *G06F 17/5068* (2013.01); *G06F 2217/12* (2013.01); *H01L 21/0274* (2013.01)

(58) Field of Classification Search
None
See application file for complete search history.

(56) References Cited

U.S. PATENT DOCUMENTS

| 7,003,758 B2* | 2/2006 | Ye | G03F 7/705 378/35 |
| 7,488,933 B2* | 2/2009 | Ye | G03F 7/705 250/252.1 |

(Continued)

FOREIGN PATENT DOCUMENTS

| TW | 201011473 A | 3/2010 |
| WO | 2016012316 A1 | 1/2016 |

OTHER PUBLICATIONS

Search Report dated Oct. 13, 2016.

*Primary Examiner* — Leigh Garbowski
(74) *Attorney, Agent, or Firm* — Scully Scott Murphy and Presser; Frank DiGiglio

(57) ABSTRACT

A method of mask correction where two independent process models are analyzed and co-optimized simultaneously. In the method, a first lithographic process model simulation is run on a computer system that results in generating a first mask size in a first process window. Simultaneously, a second hard mask open etch process model simulation is run resulting in generating a second mask size in a second process window. Each first lithographic process model and second hard mask open etch process model simulations are analyzed in a single iterative loop and a common process window (PW) optimized between lithography and etch is obtained such that said first mask size and second mask size are centered between said common PW. Further, an etch model form is generated that accounts for differences in an etched pattern due to variation in three-dimensional photoresist profile, the model form including both optical and density terms that directly relate to an optical image.

16 Claims, 15 Drawing Sheets

(51) Int. Cl.
   *G03F 1/36*    (2012.01)
   *H01L 21/027*  (2006.01)

(56) References Cited

U.S. PATENT DOCUMENTS

| | | | |
|---|---|---|---|
| 7,873,504 B1 * | 1/2011 | Bevis .................. | G03F 1/36 356/252 |
| 8,035,824 B2 * | 10/2011 | Ausschnitt .......... | B81C 99/0065 356/401 |
| 8,084,169 B2 | 12/2011 | Hamouda | |
| 8,245,160 B2 * | 8/2012 | Ye ..................... | G03F 7/705 430/5 |
| 8,318,391 B2 * | 11/2012 | Ye ..................... | G03F 1/44 257/48 |
| 8,359,562 B2 | 1/2013 | Sarma et al. | |
| 8,751,845 B2 | 6/2014 | Assad et al. | |
| 8,806,387 B2 | 8/2014 | Cao et al. | |
| 8,832,610 B2 * | 9/2014 | Ye ..................... | G03F 1/144 716/50 |
| 8,938,696 B1 * | 1/2015 | Torunoglu .......... | G06F 17/5068 716/53 |
| 8,954,898 B2 * | 2/2015 | Inoue ................. | G03F 1/70 716/52 |
| 9,390,206 B2 * | 7/2016 | Ye ..................... | G03F 7/705 |
| 9,619,607 B2 * | 4/2017 | Tao .................... | G06F 17/5081 |
| 2007/0031745 A1 | 2/2007 | Ye et al. | |
| 2008/0072207 A1 | 3/2008 | Verma et al. | |
| 2012/0040280 A1 | 2/2012 | Agarwal et al. | |
| 2014/0359543 A1 * | 12/2014 | Tao .................... | G03F 7/70441 716/53 |
| 2017/0160648 A1 * | 6/2017 | Tel ..................... | G03F 7/70516 |

\* cited by examiner

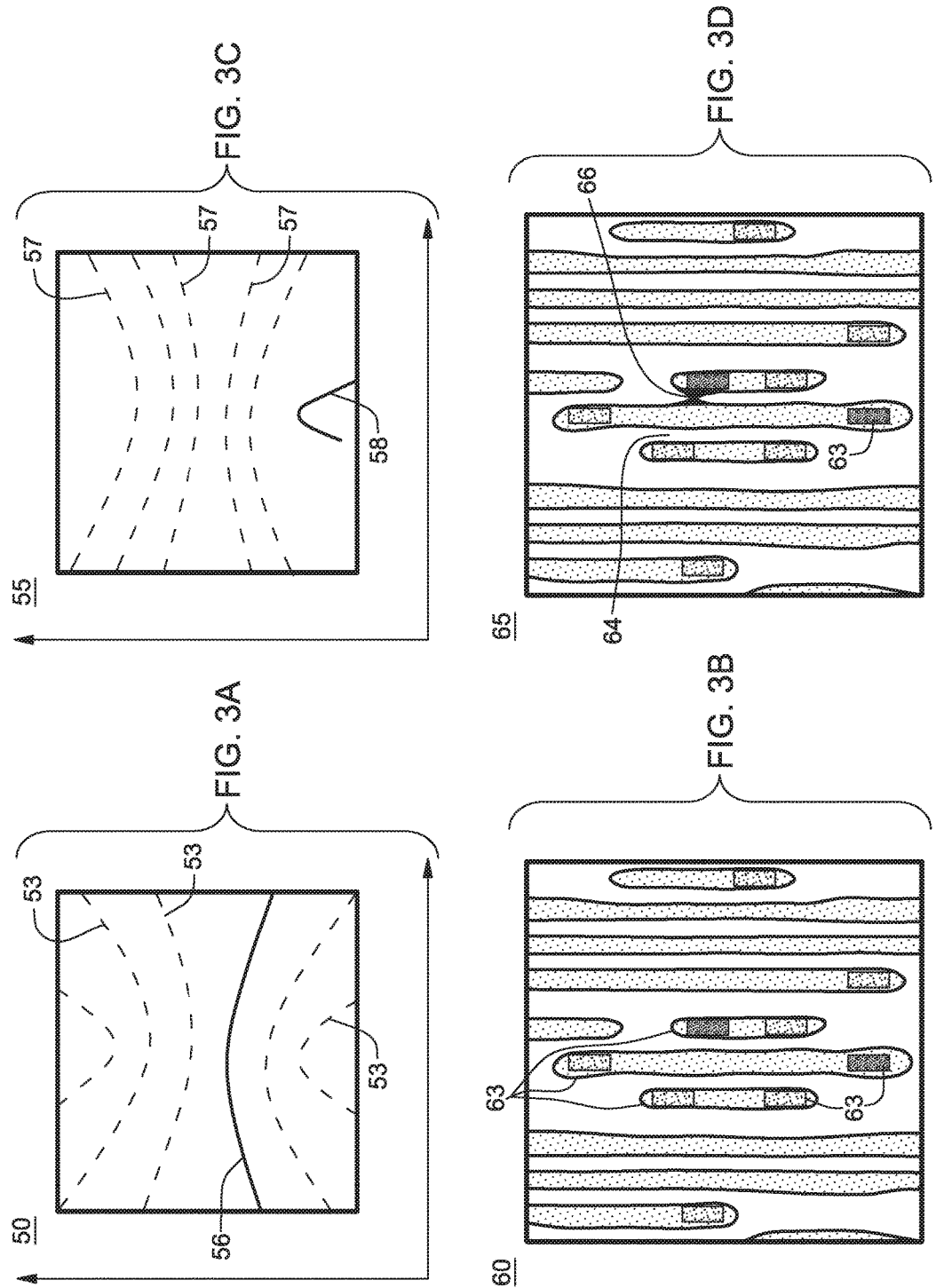

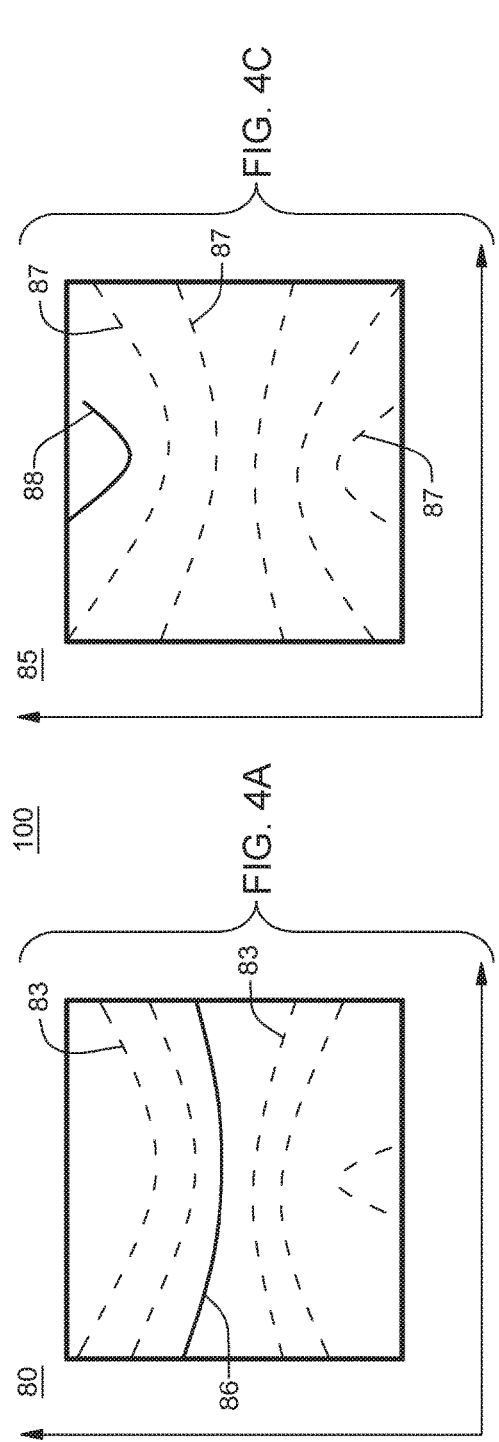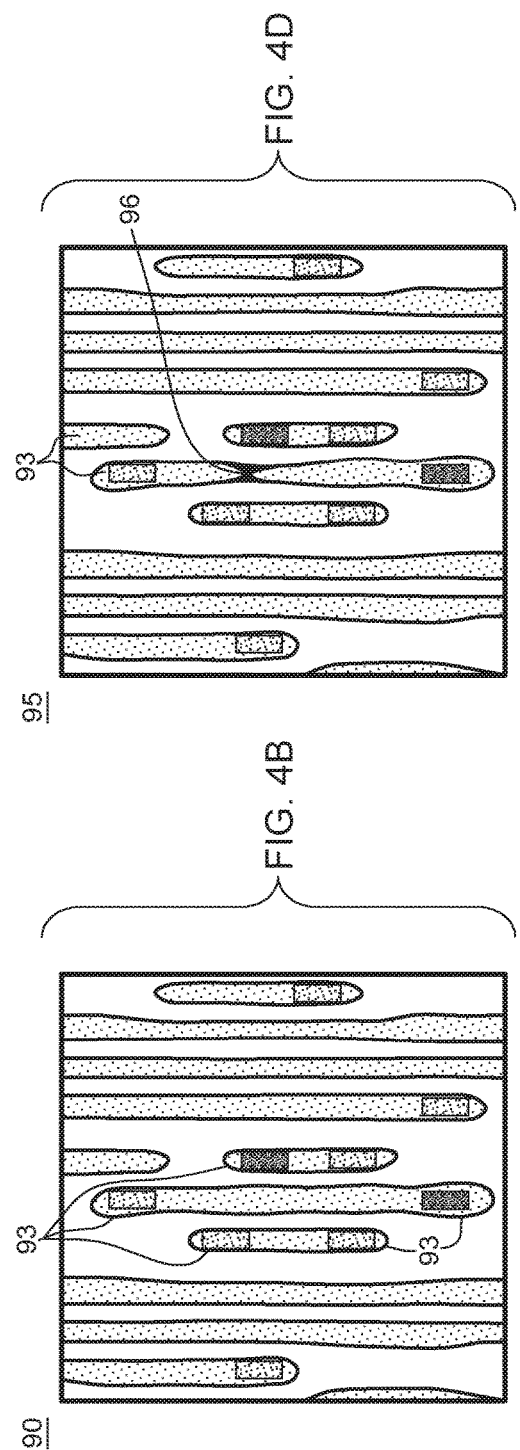

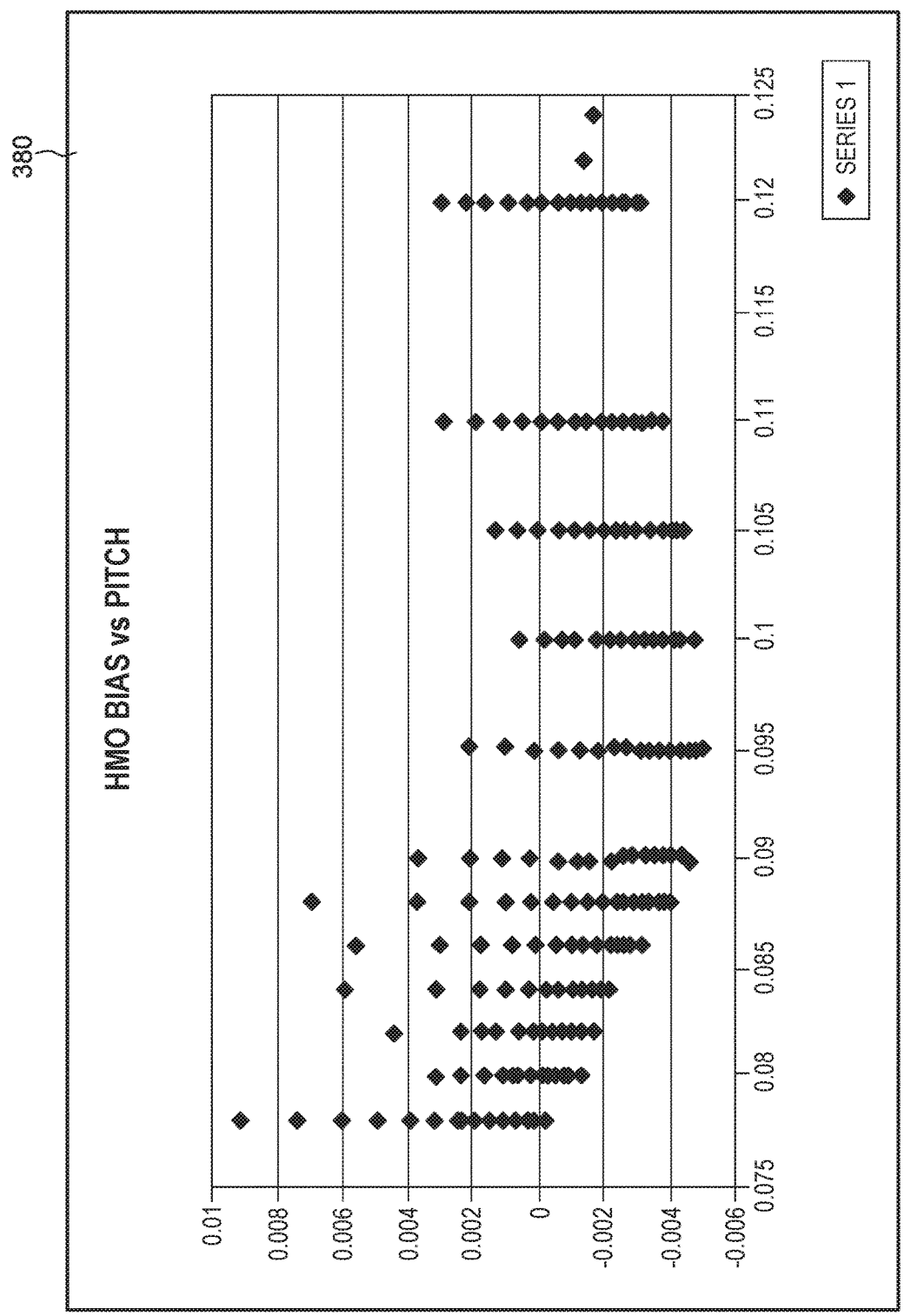

| Litho Line 362 | Litho Space 364 | HMO Line 366 | HMO Space 368 | Mask Movement 370 |
|---|---|---|---|---|
| In Spec | In Spec | In Spec | In Spec | No |
| Out Spec | In Spec | In Spec | In Spec | LithoW*FB*LLE |
| In Spec | Out Spec | In Spec | In Spec | - LithoW*FB*LSE |
| Out Spec | Out Spec | In Spec | In Spec | LithoW*FB*LLE - LithoW*FB*LSE |
| In Spec | In Spec | Out Spec | In Spec | HMOW*FB*HLE |
| Out Spec | In Spec | Out Spec | In Spec | LithoW*FB*LLE + HMOW*FB*HLE |
| In Spec | Out Spec | Out Spec | In Spec | - LithoW*FB*LSE + HMOW*FB*HLE |
| Out Spec | Out Spec | Out Spec | In Spec | LithoW*FB*LLE - LithoW*FB*LSE + HMOW*FB*HLE |
| In Spec | In Spec | In Spec | Out Spec | - HMOW*FB*HSE |
| Out Spec | In Spec | In Spec | Out Spec | LithoW*FB*LLE - HMOW*FB*HSE |
| In Spec | Out Spec | In Spec | Out Spec | - LithoW*FB*LSE - HMOW*FB*HSE |
| Out Spec | Out Spec | In Spec | Out Spec | LithoW*FB*LLE - LithoW*FB*LSE - HMOW*FB*HSE |
| In Spec | In Spec | Out Spec | Out Spec | HMOW*FB*HLE - HMOW*FB*HSE |
| Out Spec | In Spec | Out Spec | Out Spec | LithoW*FB*LLE + HMOW*FB*HLE - HMOW*FB*HSE |
| In Spec | Out Spec | Out Spec | Out Spec | - LithoW*FB*LSE + HMOW*FB*HLE - HMOW*FB*HSE |
| Out Spec | Out Spec | Out Spec | Out Spec | LithoW*FB*LLE - LithoW*FB*LSE + HMOW*FB*HLE -HMOW*FB*HSE |

FIG. 11

METHOD OF SIMULTANEOUS LITHOGRAPHY AND ETCH CORRECTION FLOW

BACKGROUND

The present disclosure relates to semiconductor manufacturing, and particularly to system and method for performing simultaneous lithography and etch processes correction flow.

In an example "tape out" flow, i.e., where data processing methods and simulations are implemented for building a single mask and/or correcting for lithographic errors for semiconductor layer design, the method, in one embodiment, enables a move (e.g., a shifting) of individual mask polygons to account for any predicted overlay errors, for example, in or during an Optical Proximity Correction (OPC) step. OPC is used to correct for lithographic nonlinearities by performing simulations, modeling the lithography process, and for example, based on modeling correct for optimizing the mask size, e.g., (change the mask size). Performing OPC processes thus delivers a mask "shape" and the mask data (of the shape) is used to form (print) mask and the printed mask used in a lithographic process to form a semiconductor feature.

As critical dimension continue to shrink beyond 22 nm technology node, the process window for each process step reduces accordingly. As a result, after performing a lithographic printing process using the OPC designed mask, it is seen that resulting etch steps fail significantly in multiple critical design configurations when using etch processes after lithography, e.g., a Reactive Ion Etch (RIE).

Thus, OPC provides a mask shape which is used to build a mask and use of the correct lithography will print the feature. However, due to RIE etch phase processing, the printed features on a substrate are increasingly failing.

Ideally, there is a set of process conditions where there are no failures found. This set of conditions is the process window (PW) i.e., range of focus and dose variation where wafers can be printed without failure. Masks created must have tolerance to these process variations. For example, as known, a focus exposure matrix governs the wafer processes, with some variations placed in to account for the manufacturing process variables. In lithography, it is the focus and exposure dose (i.e., how well focus is held, and the amount of light (exposure dose)) that are the primary variables in lithography. Focus and Exposure and dose variations are generated into a matrix, and the wafer is exposed through patterns of focus and dose variations to generate the matrix. The patterns are measured across all process and exposure conditions.

It is the case that in patterning, within a "process window" (PW), the boundaries of lithography and etching have been conflicting each other and resulting in optimizing each of them independently will push the other in hard fails, particularly as the technology moves to 22 nm and beyond.

As a particular example, one type of excessively determined failure is resist top loss induced fails on etch at a hard mask open ("HMO") (HMO etch process) step.

FIG. 1 shows an example photoresist material top-loss phenomenon, and failed pattern transfer through etch. A top down view shows a pair of mask edges 12A, 12B defining a gap 15 for deposition of a resist layer 18 on a wafer as shown. As shown in FIG. 1, graph 13 shows the normalized resist thickness that results as a function of applied light (exposure) to the resist layer. As shown, no material loss is exhibited with low dose exposure. As shown on the accompanying graph 13, after an exposure, ideally the photoresist layer would not lose any material until such a large enough dose is applied (e.g., a critical dose) with an ideal amount of light exposure. However, due to this resist characteristics, it loses its thickness/volume from its original level 11, i.e., resist top loss (resist height level is decreased) when scattered photons hit the un-exposed area. That results in the pattern pinching and cannot be transferred through etch. Different design configurations lead to different levels of latent (resist) intensity 19, and the degree of resulting resist heights may vary, e.g., as shown in resist features 18A, 18B or 18C for a same critical dimension (CD). That is, only the height of the resist is affected but not the CD, i.e., bottom dimension (due to variation of focus and/or dose (process variation), mask design shape, etc.).

In the lithographic modeling employed, SEM measurements are made to the bottom critical dimension (CD) to measure the width and/or space at the bottom of the resist. As only resist height changes the lithographic model has no knowledge of the resist height change.

Due to the resist characteristics (FIG. 1 graph 13), the exposes resist loses its thickness/volume when scattered photons hit the un-exposed area. That results in the pattern pinching and cannot be transferred through etch causing etch fails due to the HMO fails.

FIG. 2 shows a resulting wafer image 10 depicting electron-beam inspection (EBI) tool result showing multiple post RIE etch process fails 25 on multiple mask exposures/dies 30 of a wafer 20 (at a particular set of focus and does process conditions). Particularly, FIG. 2 shows an example 22 nm processing with errors at an "Mx" metal level. Here, the EBI inspection at post HMO shows no PW. Both lithographic modeling and ORC (Optical Rule Checking) could not predict the wafer fails 25 from EBI. This ORC is a simulation of the mask and checks (measurements) applied to look for problem spots (potential failures) during the wafer. The wafer fails 25 post etch shown were not predicted, i.e., the normal lithographic models could not predict this type of failure mechanism.

It is the case that a conventional OPC correction flow cannot capture the correct fail mechanism and cannot drive the mask size to an optimized common process center between lithography and etch.

Further, a lack of good etch models leads to patterning failures, e.g., a photoresist bottom CD may be in-spec, but as mentioned, fails post etch. The fails are correlated with photoresist toploss, but toploss or 3D resist profile is difficult to measure directly and model accurately. Moreover, any etch models employed tend to be inaccurate and have resulted in non-manufacturable lithographic conditions. For example, etch models lack "process window" simulation capability: 1) due to assumption that etch bias only depends on pattern density terms; and 2) there is no connection to lithographic pattern fidelity or 3D resist profile.

Moreover, while a 3D resist simulation is expensive and not appropriate for a full chip analysis, such a resist simulation could be used to build a more physical and more accurate etch model.

Moreover, when modeling a patterning process, typically separate models are built for the optical photolithograpy process and the etch process. The photolithography model involves both an optical model that describes the light formation in the exposure tool and a photoresist model that describes the exposure and development of the photoresist. These models are often calibrated to a single set of measurements taken in the post-develop photoresist using a CD-SEM. CD-SEM measurements are typically made at the bottom of the photoresist and measurement artifacts are removed through a SEM-to-physical bias correction applied to the bottom CD measurements. The etch process is typically modeled as a variable bias between the post-develop and the post-etch measurements. This variable bias is found as a function of parameters related to the pattern density of the post-develop pattern. If the photolithography is of adequate quality, the pattern density of the lithography design target can be used as a proxy for the patterned photoresist, resulting in improved simulation efficiency.

However, this approach does not fully account for the complex interactions between the 3 dimensional photoresist profile, the CD-SEM measurement capabilities and the transfer of a pattern in photoresist into a film stack through an etching process. Since the etch transfer may depend on the 3 dimensional profile of the photoresist, in addition to other factors traditionally considered in etch models such as local pattern density, it is reasonable to consider the full resist profile in creating a physical etch model.

However, 3D resist profile simulations are expensive and time consuming, and are, therefore, not suited for full chip etch modeling.

SUMMARY OF THE INVENTION

As conventional OPC correction flow cannot capture the correct fail mechanism and cannot drive the mask size to an optimized common process center between lithography and etch, a system and method is provided for co-optimizing the lithography and etch (e.g., hard mask open (HMO)) processes in OPC correction flow by driving the mask size to be centered between both litho/etch processes.

Thus, a method is provided to optimize the common process window between lithography and etch processes. For example, a robust lithography model, in addition to an HMO model, would protect against defects and allow improved lithographic process control/metrology.

Further, a method is provided to rapidly approximate the features of a 3D resist profile that contribute to a transferred etch pattern.

Accordingly, according to a first aspect, there is provided a system and method of etch mask correction. The method comprises: running, on a computer system, a first lithographic process model simulation that results in generating line or space features of a mask in a first process window; running, on the computer system, a second hard mask open etch process model simulation resulting in the generating of line or space features of the mask in a second process window; determining whether a line feature or a space feature resulting from running each the first process model simulation and second process model simulation are within a respective target specification; and modifying a mask design within a single iteration of an iterative loop process such that a line feature specification or a space feature specification are within each respective target specification, and such that a common process window (PW) optimized between lithography and etch is obtained, wherein the lithographic and etch mask process models are simultaneously co-optimized within the iterative loop processing.

In a further aspect, there is provided a calibration system and method for a hard mask open etching process. The calibration method comprises: obtaining an etch model form that accounts for differences in an etched pattern due to variation in three-dimensional photoresist profile, the model form including both optical and density parameters that directly relate to an optical image, the calibration method comprising: running an optical imaging model to generate the optical and density parameters based on the mask design specification; and in an iterative processing loop, and inputting the optical image parameters in each of a first lithographic process model simulation and using the optical image parameters in the second hard mask open etch process model simulation as a proxy for a 3D resist profile, wherein an efficient and accurate simulation of an etched pattern is generated.

BRIEF DESCRIPTION OF THE DRAWINGS

The features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the disclosure in conjunction with the detailed description. In the drawings:

FIG. 3A shows a convention that is used for a given dose and mask position anchor, in which lithographic process window optical proximity correction (PWOPC) process is employed to optimize the mask size to enlarge the lithographic PW without knowledge or awareness of any potential HMO etch bias issue;

FIG. 3B shows the resulting resist features print of critical feature dimensions using a photoresist mask designed in accordance with the optimized litho PWOPC process window of FIG. 3A;

FIG. 3C shows a resulting HMO/etch processing window given the dose and mask position anchor and litho process window OPC (PWOPC) process of FIG. 3A;

FIG. 3D shows the resulting resist features print of critical feature dimensions using a photoresist mask designed in accordance with the optimized PWOPC process window of FIG. 3A and resulting HMO/etch process window of FIG. 3C;

FIG. 4A shows a convention that is used for a given dose and mask position anchor, in which HMO (hard mask open)/etch process window HMO PWOPC process is employed to optimize the mask size to enlarge HMO PW, however without knowledge or awareness of any potential lithographic processing issue;

FIG. 4B shows the resulting resist features print of critical feature dimensions using a photoresist mask designed in accordance with the optimized HMO PWOPC process is employed to optimize the resulting resist feature print of critical features dimensions using a photoresist mask designed in accordance with the optimized PWOPC process window of FIG. 4A;

FIG. 4C shows a resulting lithographic processing window given the dose and mask position anchor and HMO OPC process window (PWOPC) process of FIG. 4A, employed to optimize the HMO etch processing window for printing metal lines, for example;

FIG. 4D shows the resulting resist features print of critical feature dimensions using a photoresist mask designed in accordance with the optimized HMO PWOPC process window of FIG. 4A;

FIG. 8B shows an example plot relating an HMO etch Bias (Y-axis) versus pitch;

FIG. 11 shows an example table specifying, in one embodiment, how to modify the mask size or design upon determining that the resultant simulated output PW litho/HMO contours are not within their target specifications.

DETAILED DESCRIPTION OF THE INVENTION

Figure 1:
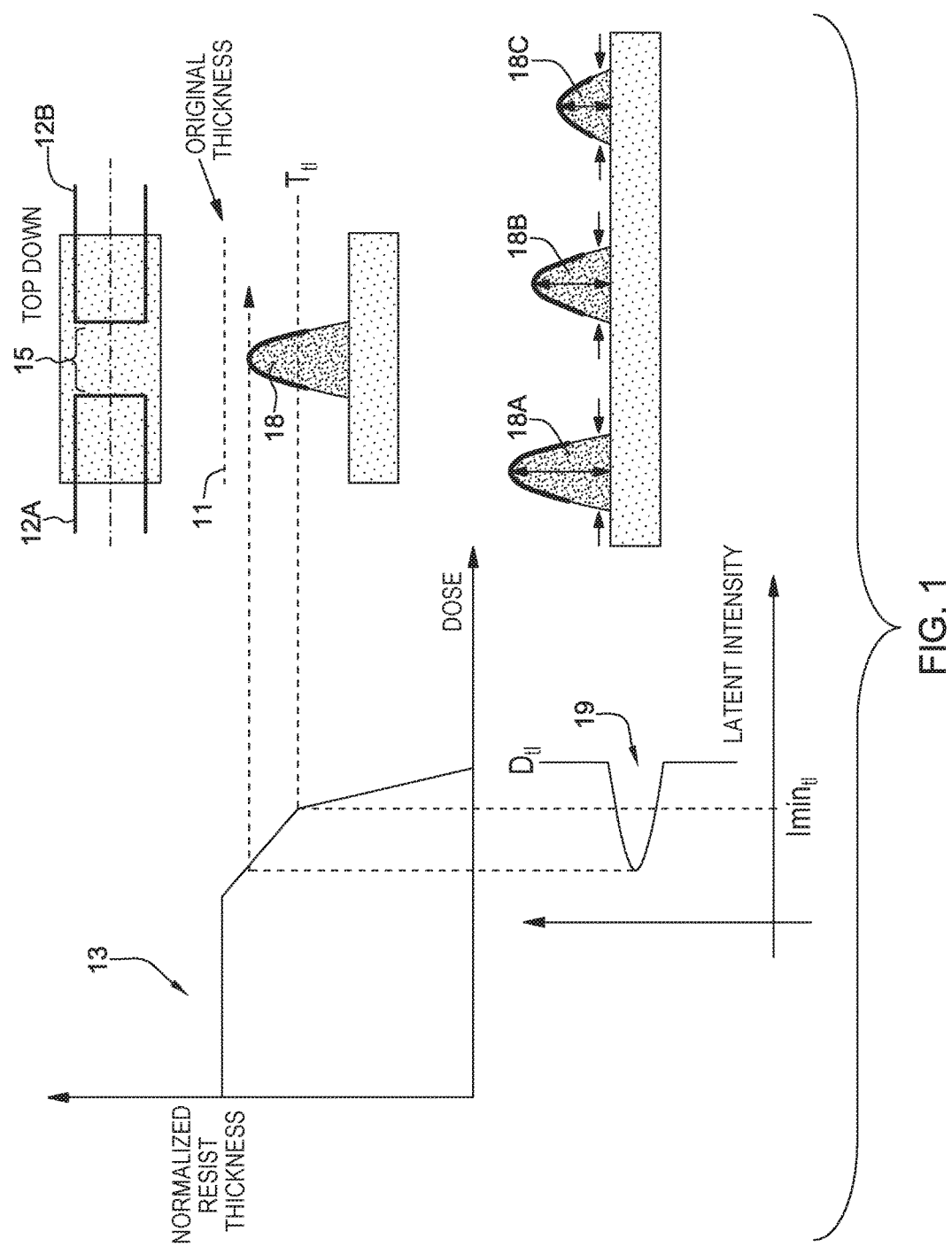
FIG. 1 shows an example photoresist material top-loss phenomenon, and resulting in failed pattern transfer through etch.

The present disclosure will now be described in greater detail by referring to the following discussion and drawings that accompany the present application. The drawings of the present application, which are referred to herein below in greater detail, are provided for illustrative purposes.

FIG. 3A shows a convention that is used for a given dose and mask position anchor, in which photolithographic ("litho") process window OPC (PWOPC) process 50 is employed to optimize the mask size to enlarge the lithographic PW however without knowledge or being aware of any potential issues in the HMO process. Here, dashed lines 53 represent litho CD variations through focus and dose of a given metal space target, for example. One goal, as depicted in FIG. 3A, is to ensure that the maximum litho process window for critical dimension features can be printed, e.g., without worrying what is happening within the HMO (hard mask open) process window. In one embodiment, the processing conditions proximate the center line 56 of the process window range 50 will result in the more accurate features meeting CD requirements.

FIG. 3B shows the resulting resist features print 60 of critical feature dimensions using a photoresist mask designed in accordance with the optimized litho PWOPC process window 50 of FIG. 3A. As shown in this example depicted, process variations within the PWOPC process window 50 results in printed lithographic features 60 including highly accurate printed and spaced features 63 with maximized litho space CD printability shown.

Figure 3F:
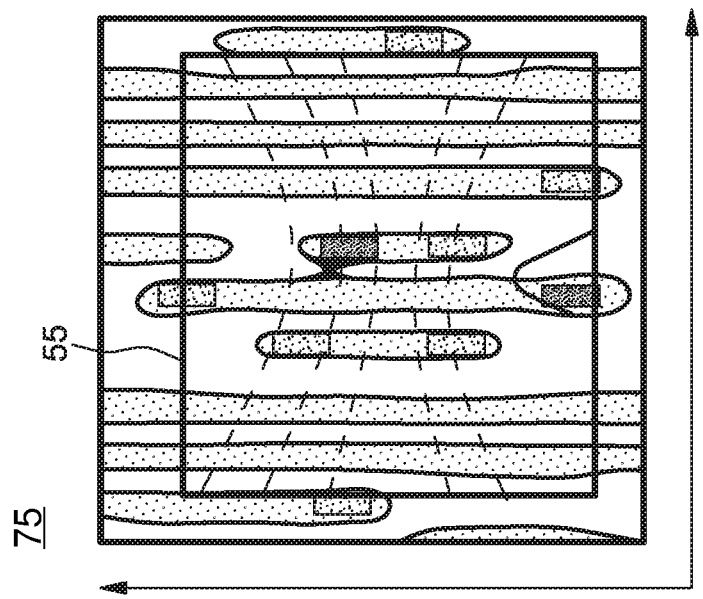
FIG. 3F depicts a conceptual superposition of the designed litho process window (PWOPC) and conditions of FIG. 3C over its resultant CD features printed, e.g., at conditions during the example PWOPC litho window after performing the HMO/etch process.
Figure 3E:
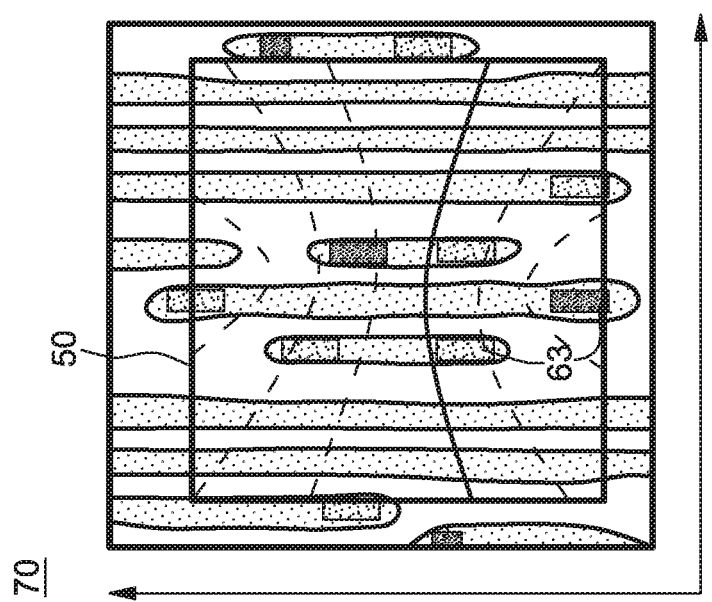
FIG. 3E depicts a conceptual superposition of the designed litho process window (PWOPC) and conditions of FIG. 3A over its resultant CD features printed, e.g., within the example PWOPC litho window, without regard for the HMO/etch process.

FIG. 3E depicts a conceptual superposition 70 of the designed litho process window (PWOPC) 50 and conditions 53 of FIG. 3A over its resultant CD features 60 printed, e.g., within the example PWOPC litho window 50, without regard for the HMO/etch process.

FIG. 3C shows a resulting HMO/etch processing window 55 given the dose and mask position anchor and litho process window OPC (PWOPC) process 50 of FIG. 3A employed to optimize the lithographic processing window for printing metal lines, for example. Here, while attempting to enlarge the lithographic PW results in non-optimized HMO etch window conditions. That is, dashed lines 57 represent the resultant HMO etch CD variations of a given target across process window conditions during which a litho process is to be performed in obtaining printed mask for critical features litho process window. However, as driven by the litho PWOPC process 50, although the target is printed at maximum litho PW, that same target 58 is not patterned at the center of its HMO process window. In fact, it is pushed to near or at the edge of the HMO process window 55 of FIG. 3C, resulting in a very little chance for that pattern to survive at HMO step.

FIG. 3D shows the resulting resist features print 65 of critical feature dimensions using a mask designed in accordance with the optimized PWOPC process window 50 of FIG. 3A and resulting HMO/etch process window 55 of FIG. 3C to result in a feature print 65 of critical feature dimensions at HMO step. However, as shown in this example depicted FIG. 3D, process variation within the PWOPC process window 55 for HMO/etch results in tighter boundaries between printed and etched features at 64, and in particular, a hard fail feature print at 66 where the line features merge notwithstanding that more accurate lithographic features 63 are printed with maximized CD features shown near the edge of the process window under processing conditions proximate the line 58 of the process window range 55 of FIG. 3C. Here, the RIE etch process has been pushed to almost outside its ideal processing window at conditions corresponding to line 58.

FIG. 3F depicts a conceptual superposition 75 of the designed HMO process window (PWOPC) 55 and conditions 57 of FIG. 3C over its resultant CD features 63, 64, 66 printed, e.g., at conditions during the example PWOPC HMO window 55 after performing the HMO/etch process.

FIG. 4A shows a convention that is used for a given dose and mask position anchor, in which HMO (hard mask open)/etch process window HMO PWOPC process 80 is employed to optimize the mask size to enlarge HMO PW, however without knowledge or being aware of any potential lithographic processing issue. Here, dashed lines 83 represent HMO CD variations across process window in which various degrees of mask critical feature dimension will be printed for metal spaces, for example. One goal, as depicted in FIG. 4A, is to ensure that critical dimension features can be etched (hard mask open) in the maximum process window. In one embodiment, the processing conditions proximate the center line 86 of the process window range 80 will result in the more accurate etched features meeting CD requirements.

FIG. 4B shows the resulting resist features print 90 of critical feature dimensions using a photoresist mask designed in accordance with the optimized HMO PWOPC process 80 is employed to optimize the resulting resist feature print 90 of critical features dimensions using a photoresist mask designed in accordance with the optimized PWOPC process window 80 of FIG. 4A. As shown, in this example depicted, process variation within the PWOPC process window 80 results in lithographic printed and etched features 90 including highly accurate printed features 93 with maximized CD process window shown.

FIG. 4C shows a resulting lithographic processing window 85 given the dose and mask position anchor and HMO OPC process window (PWOPC) process 80 of FIG. 4A, employed to optimize the HMO etch processing window for printing metal spaces, for example. Here, while attempting to optimize HMO etch window conditions alone results in a non-optimized lithographic PW. That is, dashed lines 87 represent the resultant litho CD variations of a given target across process window conditions during which an HMO etch process is to be performed in obtaining printed mask for critical feature HMO CD process window. However, as driven by the HMO PWOPC process 80, although the target 88 is patterned at maximum HMO PW, that same target is not printed at the center of its litho process window. In fact, it is pushed to near or at the edge of the litho process window 85 of FIG. 4C, resulting in that pattern cannot be printed at litho step.

FIG. 4D shows the resulting resist features print 95 of critical feature dimensions using a photoresist mask designed in accordance with the optimized HMO PWOPC process window 80 of FIG. 4A and resulting litho process window 85 of FIG. 4C to result in a resist feature print 95 of critical feature dimensions at post litho. However, as shown in this example depicted FIG. 4D, process variation within the HMO PWOPC process window 85 for lithography results in a hard fail feature print at 96 where the line features are pinched, notwithstanding that more accurate lithographic features 93 are printed with maximized CD features shown near the edge of the process window under processing conditions proximate the line 88 of the process window range 85 of FIG. 4C. Here, the RIE etch process has been centered within the process window; however lithographic process has been pushed to almost outside the ideal litho processing window at conditions corresponding to line 88.

Figure 5:
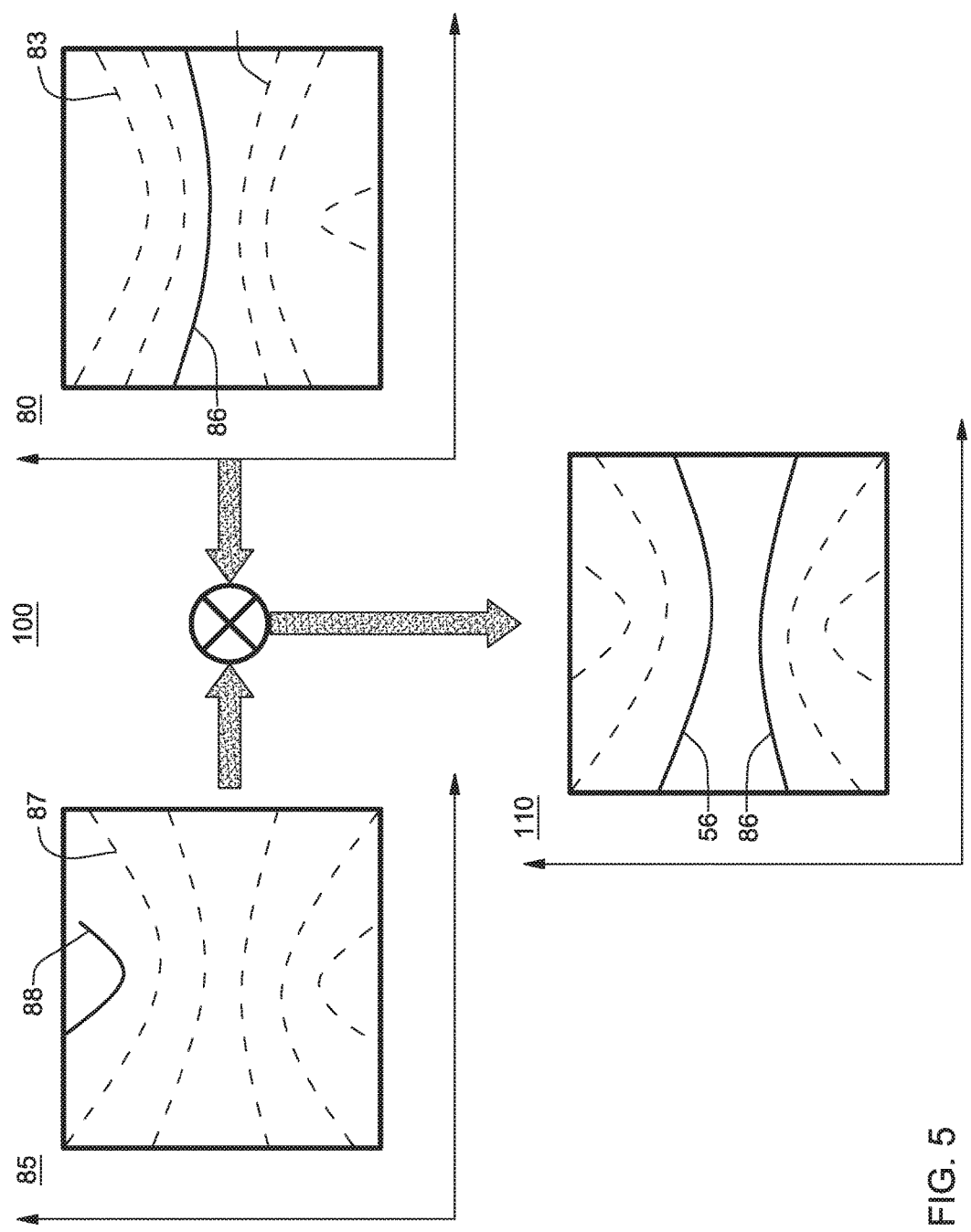
FIG. 5 depicts a method to co-optimize both the litho and etch (HMO) in OPC correction flow by driving the mask size to be centered between both litho/etch processes in one embodiment.

FIG. 5 conceptually depicts the method to co-optimize both the litho and etch (HMO) in OPC correction flow by driving the mask size to be centered between both litho and etch processes. In FIG. 5, OPC process flow simulations 100 achieves a common process window (PW) 110 optimized between lithography and etch. In the method 100 of FIG. 5, simulation processing to achieve an optimized resultant etch/HMO PWOPC process window 80 corresponding to the PW optimized for HMO PWOPC conditions as set forth in FIG. 4A is combined, in a same processing optimization loop, with the simulation processing to achieve an optimized HMO PWOPC lithographic process window 85 corresponding to the PW optimized for HMO PWOPC conditions as set forth in FIG. 4C to result in an co-optimized litho/HMO Common Window 110 providing for litho/HMO Co-Optimization. As shown, the co-optimized litho/HMO Common Window 110 provides a centered range of post litho critical dimension CD variations 56 optimized for inclusion with the post HMO etch CD variations 86. Here, mask size is driven to optimum positions to accommodate both litho and HMO/etch processes. These simulations may be implemented for the full chip.

Figure 6:
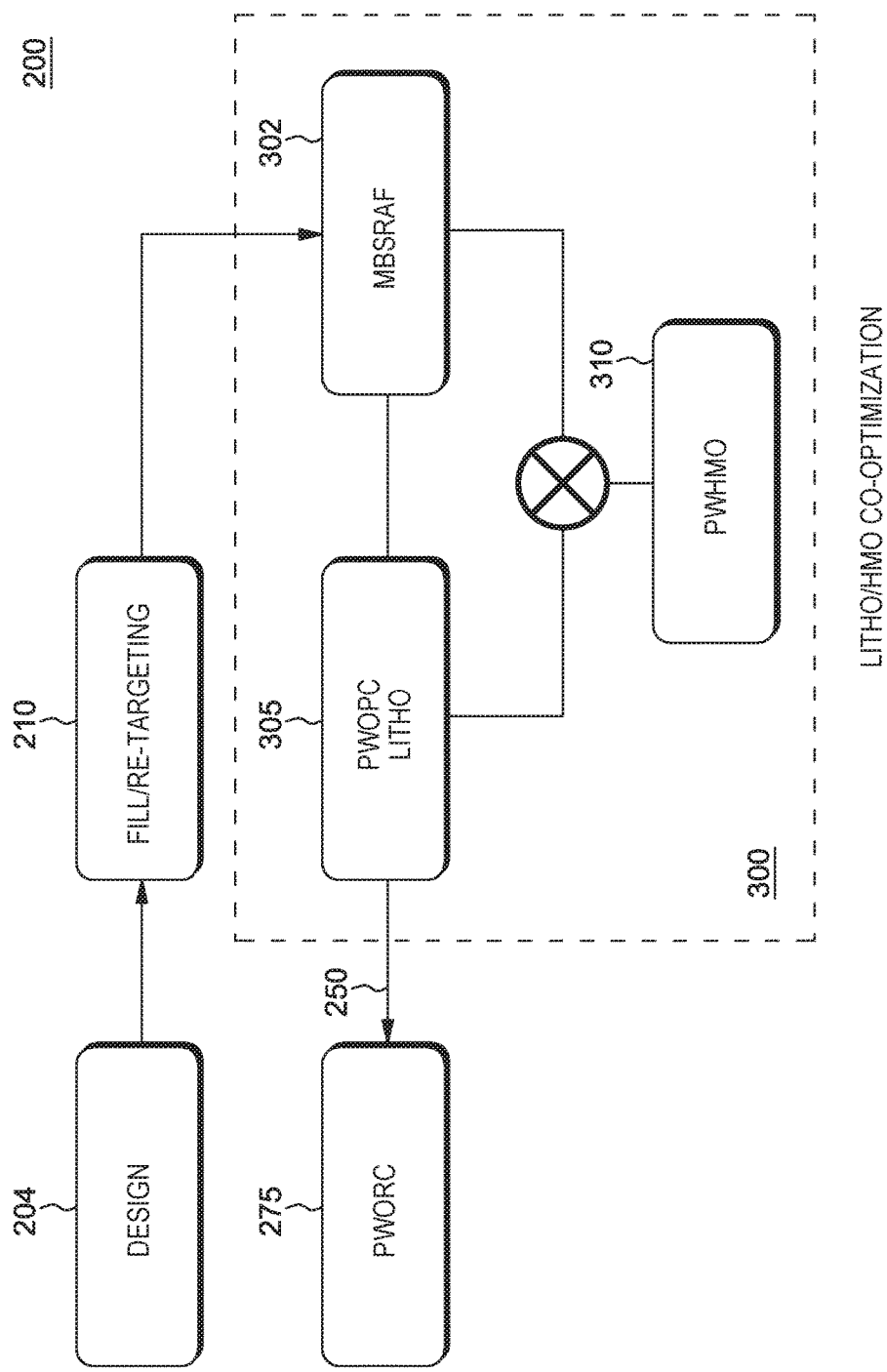
FIG. 6 depicts the method flow to co-optimize both the lithographic and etch (HMO) in OPC.

FIG. 6 depicts the flow 200 to co-optimize both the litho and etch (e.g., Hard Mask Open or HMO) in OPC. While methods herein are described relating to an Hard Mask Open etch process, it is understood that the methods herein are applicable to any type of material that is etched, e.g., nitride etch, oxide etch processes etc. In a first design step 204, there is generated a circuit design using techniques known in the art. A design may be broken into sub-design regions or chiplet designs, for example, to avoid processing an entire reticle field at once. This flow continues at 210 to produce a next dummy fill performed which is a topography fill where shapes are added to provide a layout for pattern uniformity or to avoid topography problems. This dummy fill step may be performed on a localized, i.e., chiplet by chiplet, basis for each chiplet, or for the full chip. These designs accounting for topographic corrections, are further processed in a typical retargeting step 210, e.g., on a localized, i.e., chiplet by chiplet, or full chip basis. The next few steps implement the Litho/HMO co-optimization technique 300 to obtain optimum process window for both litho and HMO etch. Here, at 302, a model-based sub-resolution assist features step is first performed according to known techniques in conjunction with the optimization for PWOPC litho at 305, generating the output contours 56 shown in FIG. 5, however, now performing performed in combination with optimizing PWHMO etch 310 generating the output contours 86 shown in FIG. 5. The output 250 is the optimum feature size computed for the mask based on the processing loop 300 and subject to further optical rule checking procedures 275. In processing loop 300, within each iteration, i.e. simultaneously, both litho PWOPC and HMO PWOPC optimization processes are performed to co-optimize the litho and etch (HMO) in OPC correction flow by driving the mask design (e.g., mask size) contours to be centered between both litho/etch processes. For example, while generating OPC code in loop 300, there is input the litho PWOPC model and HMO PWOPC model data and optionally, MBSRAF data, for tuning both models using calculations within the same processing loop 300 to set a specification indicating whether the litho CD needs to be increased, or decreased as determined; and using calculations within the same processing loop 300 to set the specification of whether the HMO etch CD needs to be increased, or decreased as determined. Then using combined information from both process CD simulations to guide the mask size changes so that it will meet both litho CD and HMO CD features specifications at the end of optimization.

Thus, in the method 200, mask correction is achieved where two independent process models analyzed and co-optimized simultaneously. Both litho PWOPC and HMO PWOPC process models run simultaneously in each iteration (within the same loop), resulting in a mask solution that avoids independent fails from each model. The optimized mask size will drive the process to stay in the path within the specifications from both independent processes in the optimization. For example, in one embodiment, through the lithographic and HMO simulation modeling, processing steps include: determining a first specification of a minimum litho CD that ensures a successful lithographic CD feature; and likewise, determining a second specification of a minimum HMO etch CD that ensures a successful etch CD feature. The first specification and second specification are input into the loop processing 300 and are used in determining the mask size to try to meet the limitations of each specification. Depending upon whether both specifications are met, or not, a weighting between the two HMO (process window RIE) and lithographic CD processes is such that the mask size changes accordingly in order to accelerate the convergence to obtain a mask size solution meeting both the first and second specifications.

Figure 2:
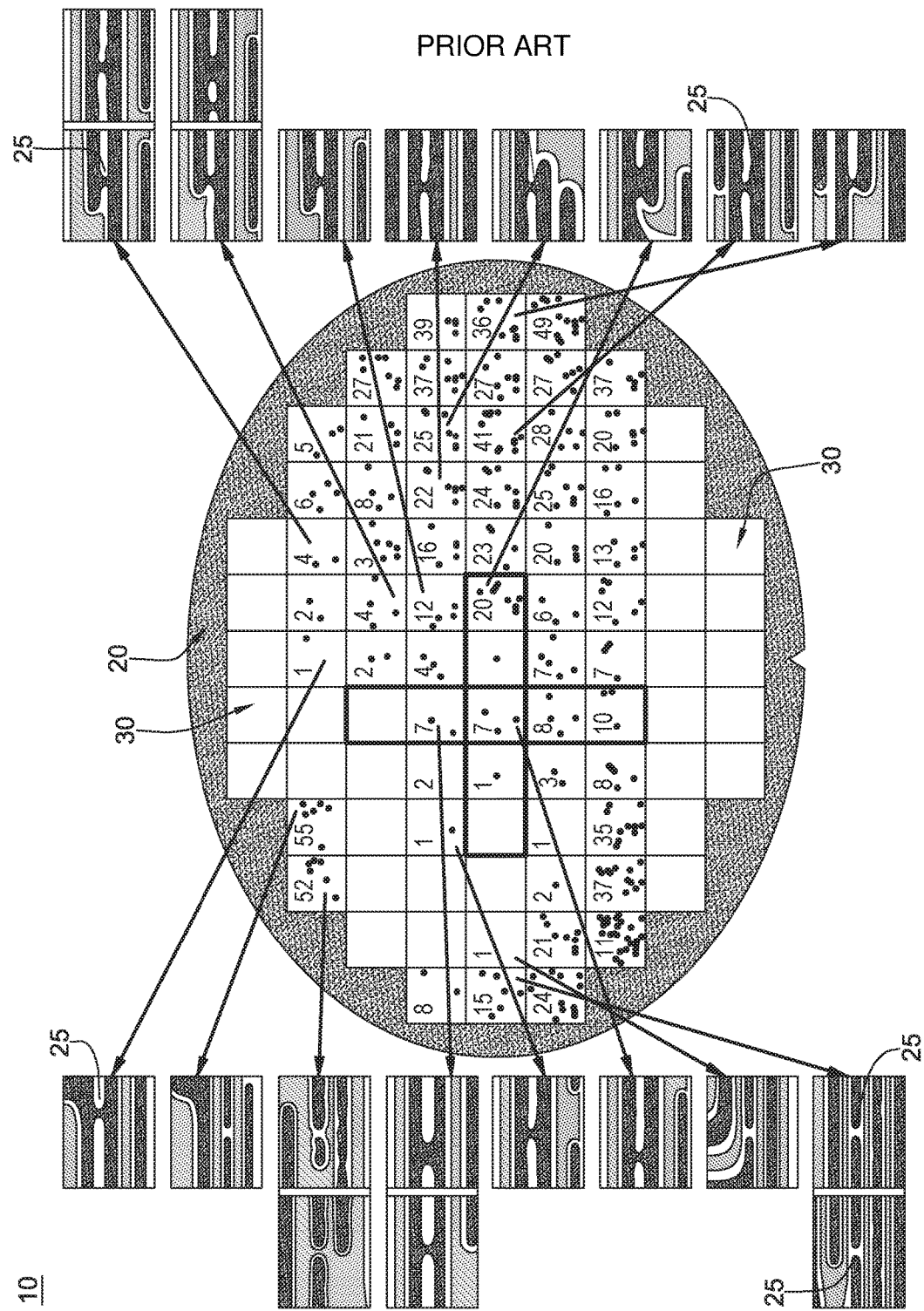
FIG. 2 shows a resulting wafer image depicting electron-beam inspection (EBI) tool result showing multiple post RIE etch process fails on multiple mask exposures of a wafer (at a particular set of focus and does process conditions)
Figure 7:
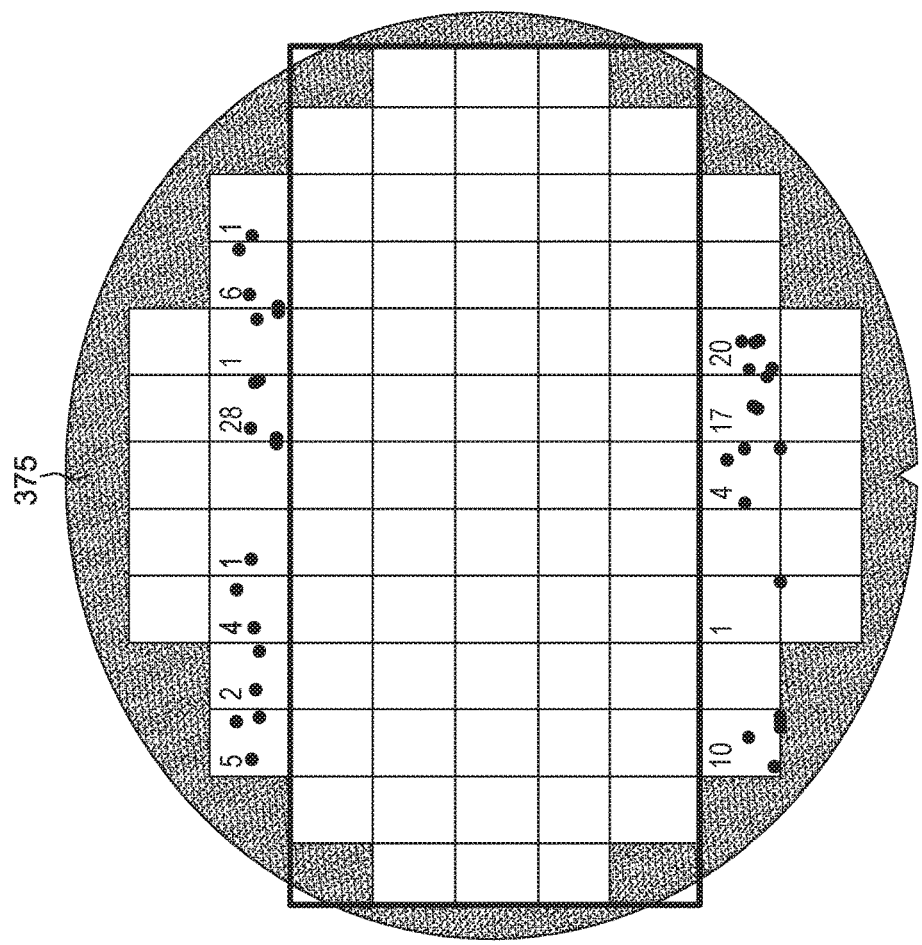
FIG. 7 shows the resulting production of a wafer with HMO etch correction as a result of the optimization loop processing of FIG. 6.

As a result of the processing 200 and optimization loop processing 300 of FIG. 6, FIG. 7 shows the resulting production of a wafer 375 with HMO etch correction. As compared to the prior art mask and wafer processing of FIG. 2, the wafer 375 produced in accordance with the optimization scheme 200 of FIG. 6, reveals virtually no resist top loss issue found.

Thus, a method of mask correction where two independent process models analyzed and co-optimized simultaneously. Both process models run simultaneously in each iteration, resulting in a mask solution that avoids independent fails from each model. (i.e., if the mask optimization is run separately or sequentially). The optimized mask size will drive the process to stay in the path within the specs from both independent processes in the optimization.

In a further embodiment, the system and method herein uses an optical image as a proxy for the 3D resist profile, and a method to use that image to create an efficient and accurate model of an etched pattern. Just as the optical image can be used as an input to a photoresist exposure and development model that can accurately predict edge placements in photoresist, an optical image is used as an input to a model of an etch process that will accurately predict edge placements of an etched pattern. In the creation of an efficient and accurate model of an etched pattern: 1) there is used only optics and etch model which results in faster processing; and 2) the final etch edge simulation is more accurate due to the approximation of 3D resist effects.

Thus, in one embodiment, a more accurate etch model form for the PWHMO processing 310 of FIG. 6 is provided that captures 3D resist information as an image. A combination of an optical image and a "resist" model terms are used as a proxy for 3D resist profile. The processing 310 of FIG. 6, requires calibrating empirical model to etch data including: modeling etch CD, not etch bias to result in an easier measurement methodology with cleaner data.

Figure 8A:
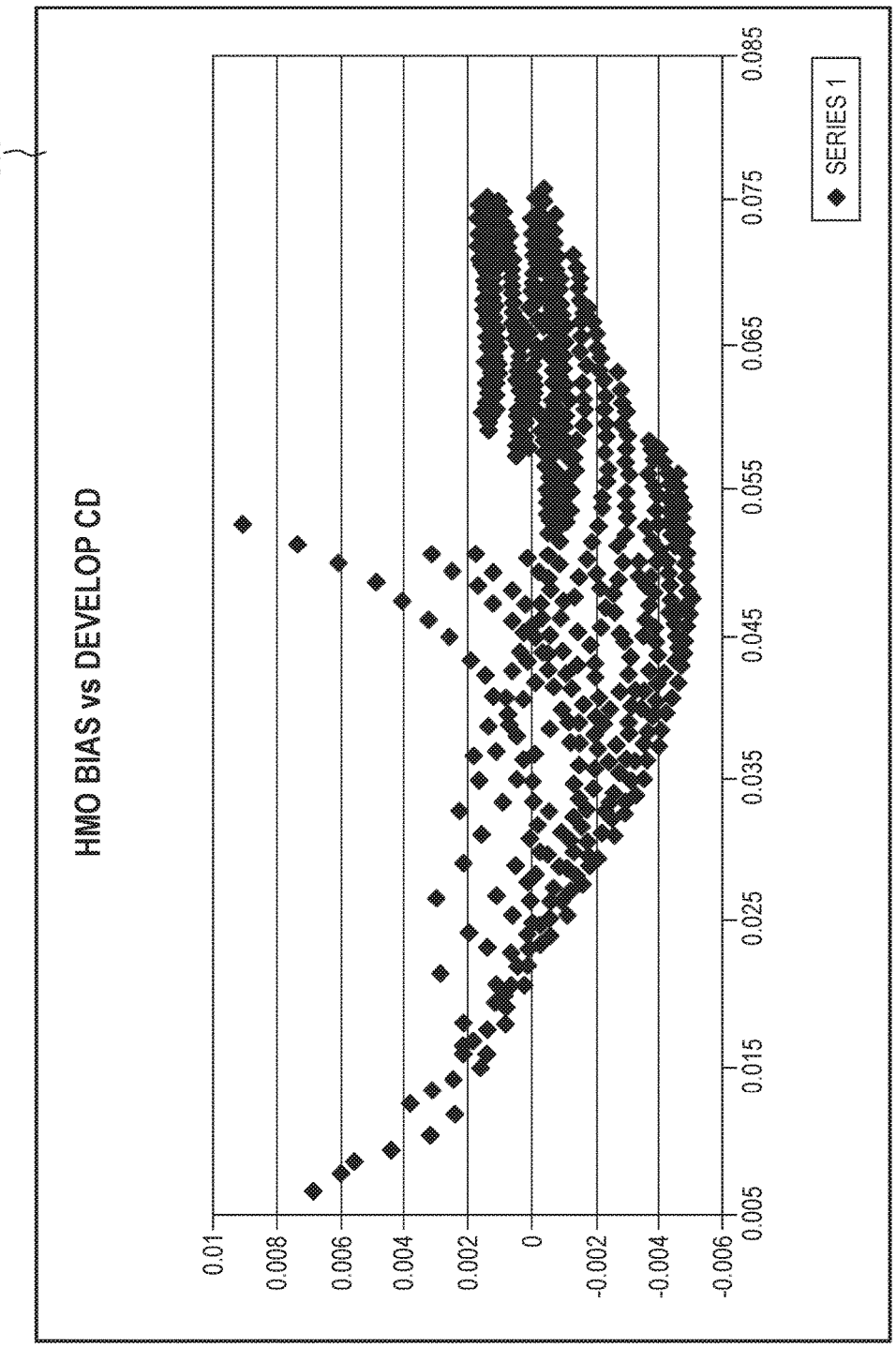
FIG. 8A shows an example plot relating the HMO etch Bias (Y-axis) versus the developed resist critical dimension (X-axis)
Figure 8C:
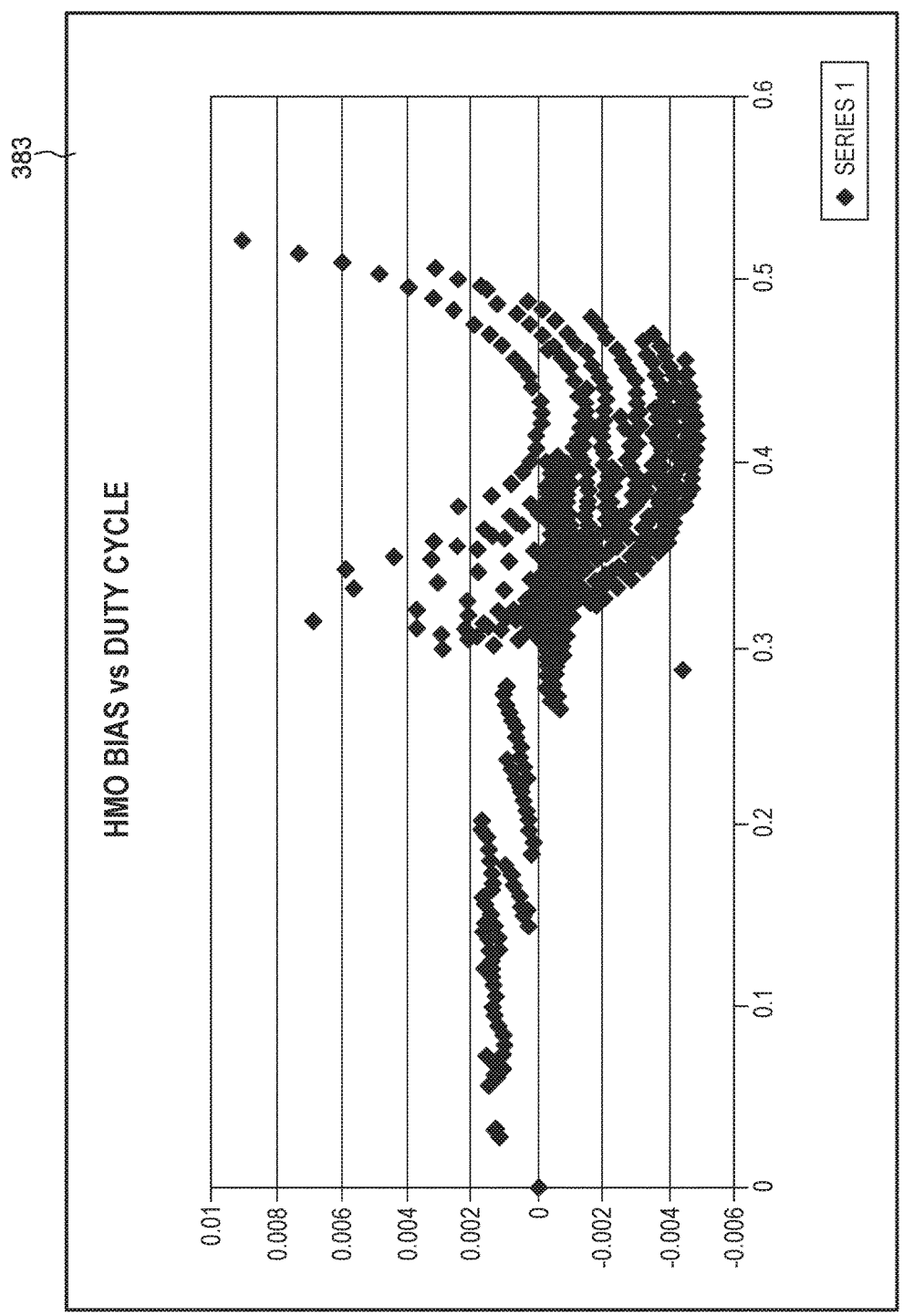
FIG. 8C shows an example plot relating the HMO etch Bias (Y-axis) versus duty cycle.

Here, in view of FIGS. 8A-8C, examples of various graphs are plotted relating HMO Bias, i.e., the change from post-develop to post-etch, versus various parameters related to the local printed pattern density. In each of the FIGS. 8A-8C, the HMO bias is computed as a change of the measurement size in the photoresist to the measurement in the hard mask (resulting from etch process). For example, FIG. 8A shows an example plot 377 relating the HMO etch Bias (Y-axis) versus the developed resist critical dimension (X-axis), i.e., the resist feature size; FIG. 8B shows an example plot 380 relating the HMO etch Bias (Y-axis) versus pitch, i.e., the periodicity of the photoresist CD pattern of features, and FIG. 8C shows an example plot 383 relating the HMO etch Bias (Y-axis) versus duty cycle of the patterned features. Each of these plots 377, 380 and 383 show significant systematic variation that is not captured by pattern density terms. That is, the HMO etch bias is not well captured by pattern density, i.e., the post-developed feature measurements are not strongly correlated with computed local printed pattern density.

Figure 10:
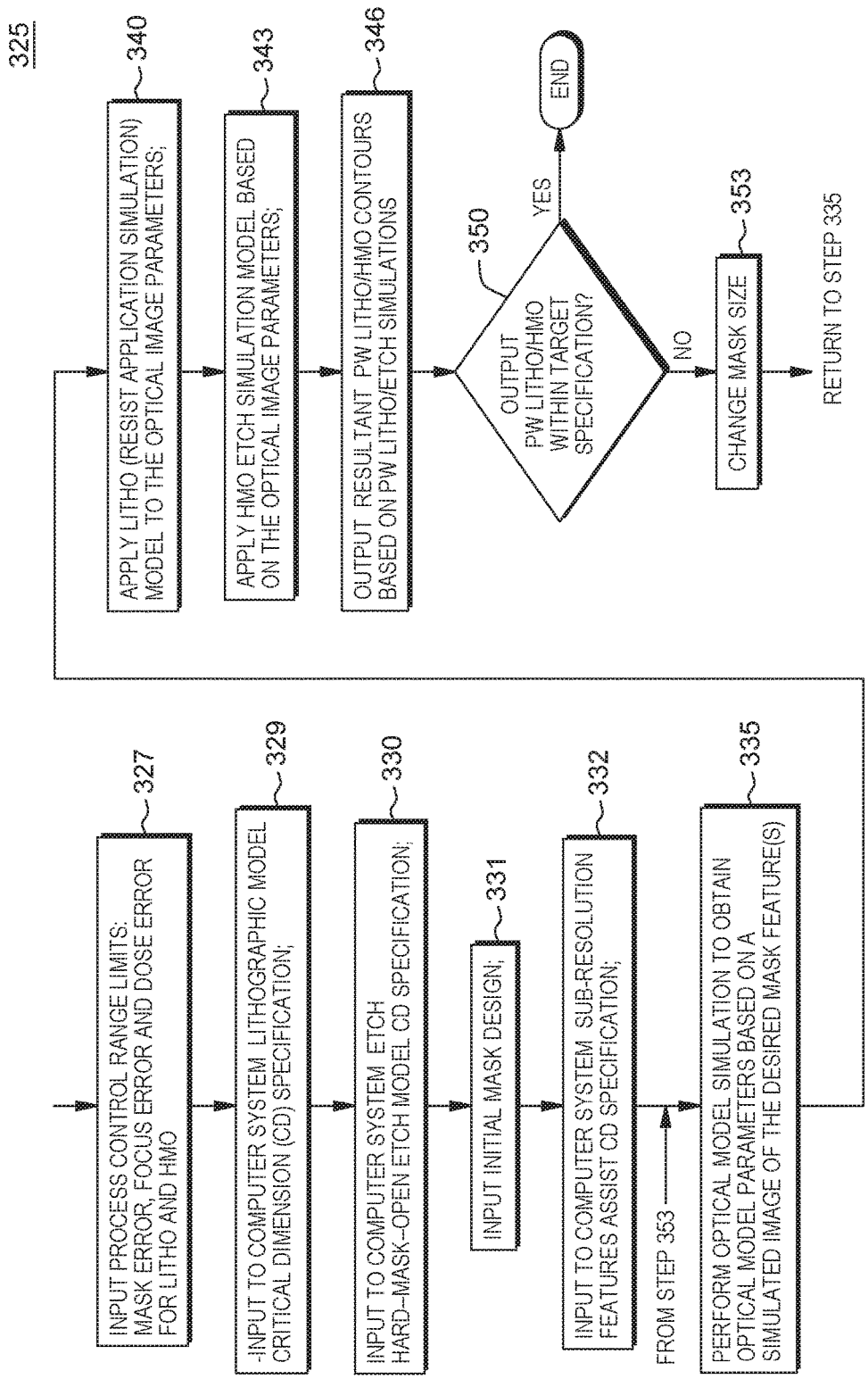
FIG. 10 shows an methodology run on a computer system for co-optimizing mask size using both litho and HMO models given specified lithographic and HMO critical dimensions.

In one embodiment, as described herein with respect to FIG. 10, a method is implemented that includes: obtaining and using an optical image as a proxy for the 3D resist profile and implementing the method in processing loop 300 to use the optical image parameters for creating an efficient and accurate model of an etched pattern. That is, by obtaining the optical image and using the image as an input to a model of the etch process, there will be accurately predicted edge placements of an etched pattern. This method is advantageous in that: 1) using only optics and an etch model is fast; and 2) the final etch edge simulation is more accurate due to the approximation of 3D resist effects.

Here, there is provided an efficient photoresist profile aware etch model form and calibration method that accounts for differences in an etched pattern due to variation in three-dimensional photoresist profile. Thus, for example: the model form includes terms that directly relate to optical image; and a calibration method relies on CD measurements of the etched image. Further, the calibration method includes an empirical fit of the CD measurements to the model form terms.

In one embodiment, the model form that includes both optical and density terms.

Figure 9:
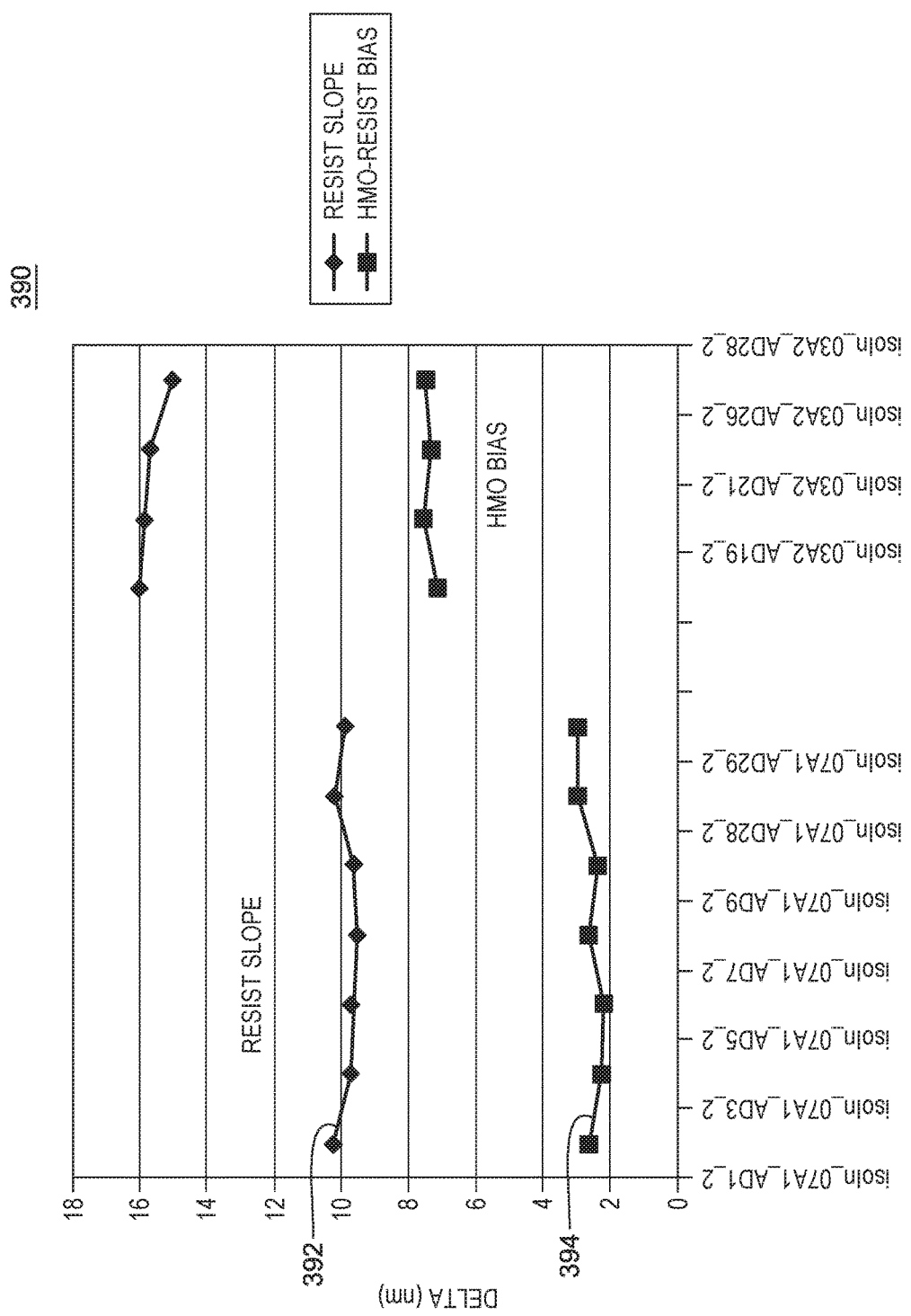
FIG. 9 shows an example plot depicting the correlation between HMO bias etch and a resist slope at various physical chip locations.

FIG. 9 shows an example plot 390 depicting the correlation between HMO bias etch 394 and a resist slope 392 at various physical chip locations. In one embodiment, the resist slope is the difference between a top and bottom CD SEM measurement, i.e., and measured as a contact angle formed between the resist and the substrate. In FIG. 9, it is seen that the HMO bias correlates well with the resist slope. For example, a computed delta 392 (difference in resist slope) as measured in nanometers, is shown plotted at various locations of a resist pattern formed and developed on a chip.

Thus, there is provided an efficient model form for simulating an etch pattern that includes both optical and density terms; and a calibration method shown in FIG. 10 that accounts for differences in an etched pattern due to variation in three-dimensional photoresist profile. In one embodiment: the model form includes terms that directly relate to optical image, and the calibration method relies on CD measurements of the etched image. Moreover, the calibration method includes an empirical fit of the CD measurements to the model form terms. Then, the etch model uses optical information to guide etch CD prediction.

FIG. 10 shows a OPC mask fabrication methodology 325 run on a computer system for optimizing a mask design using optical model parameters based on a printed feature image simulation. Use of the optical model parameters (e.g., intensity profile) provides a common "knob" used at a full chip design space to put both lithographic and RIE processes at the center of each process window, i.e., within a lithographic and HMO (e.g., RIE) etch critical dimensions (CD) specification.

As shown in the method at 327, a first step includes inputting to the computer system the process control range limits for both the lithographic resist application phase and HMO (reactive ion etch) phases. These range limits include the target mask size error, the (light) focus error and (light) dose error for use in the photolithographic model and HMO (etch) processes. These values do not necessarily have to be the same for photolithographic model and HMO (etch) model processes.

In the method at 329, a next step includes inputting to the computer system the critical dimension (CD) of the feature(s) for the lithographic model process, and at 330 inputting to the computer system the critical dimension (CD) of the particular feature(s) for the HMO (e.g., reactive ion etch) model process.

At 331, the initial mask design specification is input to the system.

Further, input to the computing system at 332 includes the sub-resolution assist feature CD specification(s) for the associated initial mask design.

In the preferred embodiment, the HMO (etch) model is based on an optical simulation. That is, in the method there is performed simulating a lithography process (typically an optical process) and simulating the etch process. At 335, the method performs, using an optical model, a simulation of the optical image resulting from a simulated printing process (a light exposure and development of the feature on the wafer) that will be created by the initial mask. A result of the optical image simulation is the optical image parameters used in both litho (photoresist model) and HMO etch simulations. In one embodiment, the optical image parameters include an intensity profile of the resulting simulated optical image. Then at 340, the litho (resist application) model is built based on the optical image parameters where the model characterizes how the photoresist responds. However, now, at 343, the HMO etch model is applied to the optical image parameters of the resulting simulated image. That is, the HMO etch model is also built using the simulated optical image. As the HMO etch model is built based on the simulated optical model a physical model of the light behavior though mask and exposure system. Thus, in the preferred embodiment, the same optical model is used for both the litho process and etch simulation processes for the co-optimization between the lithography and the HMO etch in loop 300, FIG. 6. That is, the optical model parameters obtained from the optical simulation are common element between the litho model and the HMO etch model.

Then, at 346, the method outputs the resultant PW litho/HMO contours 56, 86 based on PW litho/etch simulations.

Then, at 350, the co-optimization processing loop determines whether the output resultant PW litho/HMO contours are within the center position for both the litho and etch process windows. That is, it is determined whether the mask design, e.g., mask segments or fragments, is optimized in simulation processing loop 300 (FIG. 6) such that each of these CD specifications are met, i.e., corresponding contours 56, 86 in FIG. 5 are within the optimized process window.

In the correction algorithm 300, the co-optimization of both lithography and etch at the same time using calculated optical parameters increases the efficiency of the optimization and hence, generating the optimum mask design within the process window limits.

If it is determined at step 350 that the output resultant PW litho/HMO contours are within the center position for both the litho and etch process windows (i.e., and meet their target specifications), then the processing ends for that mask design (e.g., mask fragment). Otherwise, at 350, if it is determined that the output resultant PW litho/HMO contours are not within the center position for both the litho and etch process windows (i.e., and do not meet their target specifications), then at 353, the mask design, e.g., size, is changed and the process returns to step 335 to again perform the optical model simulation based on the change to the mask design or mask fragment.

Thus, the method is iterative between steps 335 and 353 until the optimized mask design is determined.

FIG. 11 shows an example table 360 specifying, in one embodiment, how to modify the mask (fragment or segment) size or design, upon determining at step 350 that the output resultant PW litho/HMO contours are not within their target specifications within both the litho and etch process windows.

As shown in FIG. 11, table 360 includes a series of columns depicting in a first column 362 the determination that the simulated lithographic line CD is either within or out of the target specification; a second column 364 depicting that the simulated lithographic space CD feature is either within or out of the target specification; a third column 366 depicting that the simulated HMO etch line CD is either within or out of the target specification; and a fourth column 368 depicting that the simulated lithographic space CD feature is either within or out of the target specification. The fifth column 370 shows, in one embodiment, how to modify the mask design (or mask design fragment), based on the comparison of each of the litho line, litho space, HMO line and HMO space feature against their respective target specifications. The table columns 362-370 are used to inform how to modify the mask design based on any combinations of in-specification and out of specification of the critical features indicated as determined in the co-optimized simulations.

For example, if each of the litho line, litho space, HMO line and HMO space CD features are within a target specification, then no mask movement is necessary. However, going down the rows of table 360, any permutation of an out of spec error will have a consequence in modifying the mask design. In the table, movement of a mask design may involve one or more of the following parameters: LLE is a lithographic line error representing a difference between a simulated line CD and its target specification for the mask or mask fragment; LSE is a lithographic space error representing a delta distance between simulated CD and an adjacent feature compared to the target specification; HLE is a HMO line error representing a difference between a simulated line CD and its target specification for the mask or mask fragment; HSE is a HMO etch space error representing a delta distance between simulated CD and an adjacent feature compared to the target specification; FB is a feedback factor, configurable as a tuning parameter for OPC recipe optimization in a manner as would be known to skilled artisans; LithoW is a tuning or "weighting" factor to be applied in the next iteration of OPC mask design, based on a determined lithographic parameter error; and similarly, HMOW is a tuning or "weighting" factor to be applied in the next iteration of OPC mask design based on a determined HMO etch process parameter error. Thus, based on any particular combination of simulated errors in processing loop 300 (FIG. 6) and method 325 (FIG. 10), the mask/fragment design may be modified accordingly from the table 360 of FIG. 11 such as by movement in a positive direction, a negative direction, and according to a magnitude as determined from the table 360.

Figure 12:
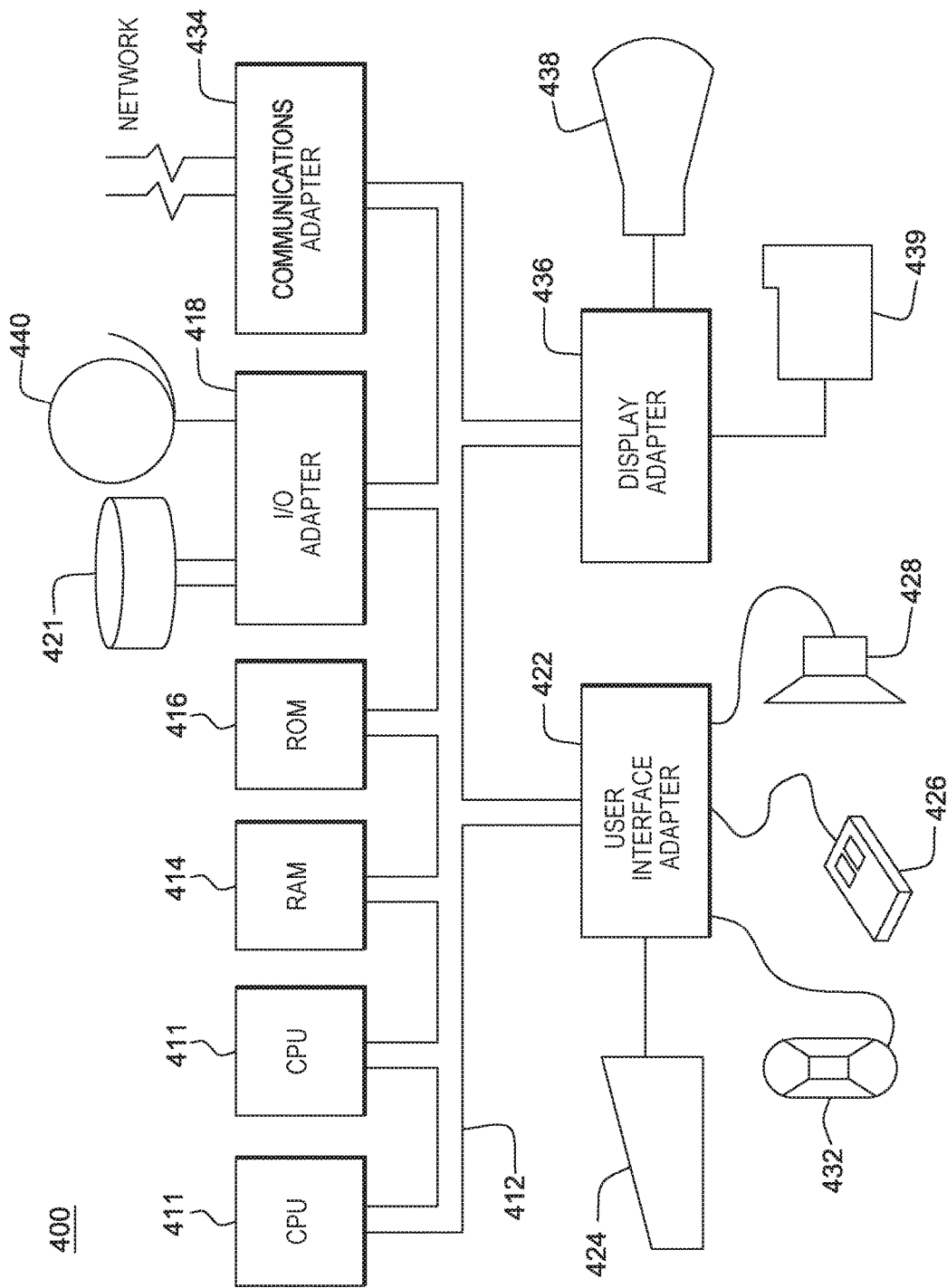
FIG. 12 depicts an exemplary hardware configuration for performing methods such as described in FIGS. 6 and 10 in one embodiment.

FIG. 12 illustrates one embodiment of an exemplary hardware configuration of a computing system 400 programmed to perform the method steps for running two simulation (lithography and etch) process models simultaneously in each iteration, resulting in a mask solution that avoids independent fails from each process model such as described herein with respect to FIGS. 5, 6 and 10. The computing system 400 is further programmed to perform the method steps to form an etch bias model that uses optical images of applied resist forms (i.e., resist angles) that correlate to pattern etch bias values such as described herein with respect to FIGS. 8A, 8B, 8C and 9.

The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of modifying a photomask design comprising:
    running, on a computer system, a first lithographic process model simulation that results in generating line or space features of a mask in a first process window;
    running, on the computer system, a second etch process model simulation resulting in the generating of line or space features of said mask in a second process window;
    determining whether a line feature or a space feature resulting from running each said first process model simulation and second process model simulation meet a respective line feature specification and space feature specification; and
    modifying a mask design within a single iteration of an iterative loop process such that the simulated line feature or the simulated space feature are within each of a respective minimum critical dimension (CD) specification; and such that a common process window (PW) optimized between lithography and etch is obtained, wherein said lithographic and etch processes are simultaneously co-optimized within the iterative loop processing.

2. The method of claim 1, wherein both first and second process models run simultaneously in each iteration to result in an optimized mask size solution that avoids independent fails from each model.

3. The method of claim 1, further comprising:
    specifying a minimum lithographic critical dimension (CD) that ensures successful printing of a lithographic CD feature; and
    specifying a minimum etch CD that ensures successful printing of a etch CD feature.

4. The method of claim 3, further comprising:
    applying a weighting between the first process window and the second etch process window to accelerate a convergence that results in an optimized mask size solution having features meeting both a minimum lithographic CD specification and a minimum etch CD specifications.

5. The method of claim 3, wherein the common process window (PW) for co-optimized lithographic process and etch process provides a centered range of post lithographic critical dimension CD optimized for inclusion with a post etch CD.

6. The method of claim 3, further comprising:
    while generating OPC code in said iterative processing loop,
        tuning both said lithographic process model and said etch process model using calculations within the same processing loop to set values for said minimum lithographic CD specification and for said minimum etch CD specification.

7. The method of claim 6, wherein said tuning comprises:
    specifying whether a mask fragment of said mask design needs to be modified in a positive or negative direction; and
    using calculations within the single iteration to set a mask fragment design movement based on a simulation that results in a lithographic or etch CD feature that is not within the minimum lithographic CD specification or minimum etch CD specification.

8. The method of claim 1, further comprising:
    running an optical imaging model to generate optical parameters based on said mask design; and in said single iteration,
    using said optical image parameters in each said first lithographic process model simulation and using said optical image parameters in said second etch process model simulation as a proxy for a 3D resist profile.

9. A system of modifying a photomask design comprising:
    a memory storage device;
    a hardware processor in communication with said memory storage device and configured to:
        run a first lithographic process model simulation that results in generating line or space features of a mask in a first process window;
        run a second etch process model simulation resulting in the generating of line or space features of said mask in a second process window;
        determine whether a line feature or a space feature resulting from running each said first process model simulation and second process model simulation meet a respective line feature specification and space feature specification; and
        modify a mask or mask fragment design within a single iteration of an iterative loop process such that the simulated line feature or the simulated space feature are within each of a respective minimum critical dimension (CD) specification; and such that a common process window (PW) optimized between lithography and etch is obtained, wherein said lithographic and etch processes are simultaneously co-optimized within the iterative loop processing.

10. The system of claim 9, wherein both first and second process models run simultaneously in each iteration to result in an optimized mask size solution that avoids independent fails from each model.

11. The system of claim 9, wherein said hardware processor is further configured to:
    specify a minimum lithographic critical dimension (CD) that ensures successful printing of a lithographic CD feature; and
    specify a minimum etch CD that ensures successful printing of a etch CD feature.

12. The system of claim 11, wherein said hardware processor is further configured to:
    apply a weighting between the first process window and the second process window to accelerate a convergence that results in an optimized mask size solution meeting both a minimum lithographic CD specification and a minimum etch CD specifications.

13. The system of claim 11, wherein the common process window (PW) for co-optimized lithographic process and etch process provides a centered range of post lithographic critical dimension CD optimized for inclusion with a post etch CD.

14. The system of claim 11, wherein said hardware processor is further configured to:
    generate OPC code in said iterative processing loop, and
    tune both said first lithographic process model and said second etch process model using calculations within the same processing loop to set values for said minimum lithographic CD specification and for said minimum etch CD specification.

15. The system of claim 14, wherein to tune, said hardware processor is further configured to:
specify whether a mask fragment of said mask design needs to be modified in a positive or negative direction; and
using calculations within the single iteration to set a mask fragment design movement based on a simulation that results in a lithographic or etch CD feature that is not within the minimum lithographic CD specification or minimum etch CD specification.

16. The system of claim 9, wherein said hardware processor is further configured to:
run an optical imaging model to generate optical parameters based on said mask design; and in said single iteration
use said optical image parameters in each said first lithographic process model simulation and using said optical image parameters in said second etch process model simulation as a proxy for a 3D resist profile.

* * * * *